United States Patent [19]
Call et al.

[11] Patent Number: 6,118,605
[45] Date of Patent: Sep. 12, 2000

[54] SYSTEM FOR GAP POSITIONING OPTIMIZATION IN A TAPE DRIVE

[75] Inventors: Mark Gregory Call, Longmont; Geoffrey Hungerford, Louisville; Bradley E. Whitney, Lafayette, all of Colo.

[73] Assignee: Storage Technology Corporation, Louisville, Colo.

[21] Appl. No.: 08/977,902

[22] Filed: Nov. 25, 1997

[51] Int. Cl.[7] ............................... G11B 5/09; G11B 15/12
[52] U.S. Cl. ................... 360/50; 360/62; 360/63
[58] Field of Search ............................ 360/50, 62, 72.2, 360/74.4

[56] References Cited

U.S. PATENT DOCUMENTS

| | | |
|---|---|---|
| 4,945,437 | 7/1990 | Oguchi et al. . |
| 5,307,217 | 4/1994 | Saliba . |
| 5,371,638 | 12/1994 | Saliba . |
| 5,675,448 | 10/1997 | Molstad et al. . |

FOREIGN PATENT DOCUMENTS

| | | |
|---|---|---|
| 0 420 374 A2 | 4/1991 | European Pat. Off. . |
| 0 617 412 A2 | 9/1994 | European Pat. Off. . |
| 0 630 018 A2 | 12/1994 | European Pat. Off. . |
| 0 789 352 A1 | 8/1997 | European Pat. Off. . |

Primary Examiner—W. Chris Kim
Attorney, Agent, or Firm—Duft, Graziano & Forest

[57] ABSTRACT

The system for gap positioning optimization in a tape drive takes advantage of the presence of a pair of read heads, located one on either side of the write head, to precisely determine the boundary between the inter-block gap and the data blocks adjoining the inter-block gap. In particular, the servo mechanisms in the tape drive note the location of the boundary between the present data block and the inter-block gap formed a the end of the present data block. When the tape is repositioned between data read/write operations, this servo information is used to identify this boundary to initiate the subsequently received data read/write operation. A predetermined amount of inter-block gap is provided at the end of the data block to ensure that subsequently received data is not written on top of the present data block or the overwriting of the next data record begins at the beginning of the data block. The system for gap positioning optimization in a tape drive activates the upstream read head during the tape acceleration process to sense the location of this boundary. The upstream read head senses the presence of a region devoid of data, indicating the inter-block gap, thereby confirming the location of the boundary with more precision than the servo data indication, and positively verifying before the write operation that the selected block is the one desired.

16 Claims, 3 Drawing Sheets

SYSTEM FOR GAP POSITIONING OPTIMIZATION IN A TAPE DRIVE

FIELD OF THE INVENTION

This invention relates to tape drive subsystems and, in particular, to a system that optimizes the operation of the tape drive to accurately determine the position of the write heads in relation to an inter-block gap located at the end of a written block of data.

PROBLEM

It is a problem in tape drive subsystems to efficiently manage the movement of the tape with respect to the read heads and the write heads of the tape drive to ensure both error free data recording and maximum utilization of the tape for data storage. In particular, the tape drive stores the received data on the tape in segments termed data blocks. A block of data is the smallest unit of data that is read or written on the tape during one continuous motion of the tape. When the received data is written on the tape and the tape drive is awaiting the next data read/write command, the motion of the tape is halted. To prevent the inadvertent overwriting of data blocks on the tape, the tape drive segregates successive blocks of data by forming an area that is devoid of data between adjacent blocks written on the tape, termed the Inter-Block Gap (IBG). These inter-block gaps are needed to provide space for the motion of the tape to be halted and then resumed without requiring that the tape transport mechanism be able to resume the motion of the tape precisely at the point at which the motion of the tape was previously halted.

Many tape drives operate by decelerating the tape when the end of a data block is reached, bringing the tape velocity to zero at a point within the IBG. The tape drive then accelerates the tape on a subsequently received read/write operation so that the tape is traveling at a speed appropriate for reading/writing data when the boundary between the end of the inter-block gap and the beginning of the next data block is reached. When operated in this mode, the tape transport must decelerate and accelerate the tape quickly enough so that the distance traveled during deceleration plus the distance traveled during acceleration is less than or equal to the length of the inter-block gap. This requires expensive drive motors to quickly accelerate and decelerate the tape and typically also requires the use of long inter-block gaps.

It is desirable to make the length of the inter-block gap as short as possible to enable the writing of more data on the tape. In addition, a shorter inter-block gap increases the average data transfer rate by minimizing the amount of tape that is devoid of data when the tape drive is reading data in a streaming mode. To minimize the inter-block gap length, many tape drives operate in a tape repositioning mode, rather than the tape start-stop mode described above. The tape repositioning operation is effected when the motion of the tape is stopped between successive operations or when the direction of movement of the tape is reversed. The tape drive uses the tape transport servo mechanism to determine the position of the end of the data record and tracks the tape position with respect to this servo readout. The tape repositioning operation comprises moving the tape in a direction and for a distance such that the tape, when accelerated to read/write speed, reaches the desired velocity prior to reaching the start of the next data block as computed with respect to the measured servo position. This enables the tape drive to minimize the length of the inter-block gaps, but requires the close coordination of the tape position with the location of the beginning of the data blocks written on the tape. If the tape drive fails to accurately determine the boundary between the inter-block gap and the beginning of the next data record, data can be missed in a data read operation, or a data write operation can begin past the beginning of the old data block, creating a new data block that has prepended thereto old data. Similarly, the tape drive can,overwrite the end of the present data block if the write operation begins too quickly. Therefore, the length of the inter-block gap is selected to be of sufficient extent to account for variability in the operation of the tape positioning mechanism, and in particular the limited accuracy of the servo mechanism and the possibility of tape stretch.

It is beneficial to improve the accuracy of the inter-block gap location determination as well as the associated control of the tape read/write operations to minimize the length of the inter-block gaps and minimize the possibility of data corruption by over- or under- writing data on the tape.

SOLUTION

The above-described problems are solved and a technical advance achieved in the field by the present system for gap positioning optimization in a tape drive. The system for gap positioning optimization in a tape drive takes advantage of the presence of a pair of read heads, located one on either side of the write head, to precisely determine the boundary between the inter-block gap and the data blocks adjoining the inter-block gap. In particular, the servo mechanisms in the tape drive note the location of the boundary between the present data block and the inter-block gap formed at the end of the present data block. When the tape is repositioned between data read/write operations, this servo information is used to identify this boundary to initiate the subsequently received data read/write operation. A predetermined amount of inter-block gap is provided at the end of the data block to ensure that subsequently received data is not written on top of the present data block or the overwriting of the next data record begins at the beginning of the data block. The determination of this boundary is subject to error and the present system for gap positioning optimization in a tape drive uses the upstream read head to sense the location of this boundary. The upstream read head is activated during the tape acceleration process at least as early as the servo mechanism indicates the location of the boundary as determined from the stored gap boundary data. The upstream read head senses the presence of a region devoid of data, indicating the inter-block gap, thereby confirming the location of the boundary with more precision than the servo data indication.

This system enables the tape drive to ensure the precise determination of the inter-block gap location and reduced the length of the required inter-block gap, due to the accuracy of this determination.

DETAILED DESCRIPTION

Figure 1:
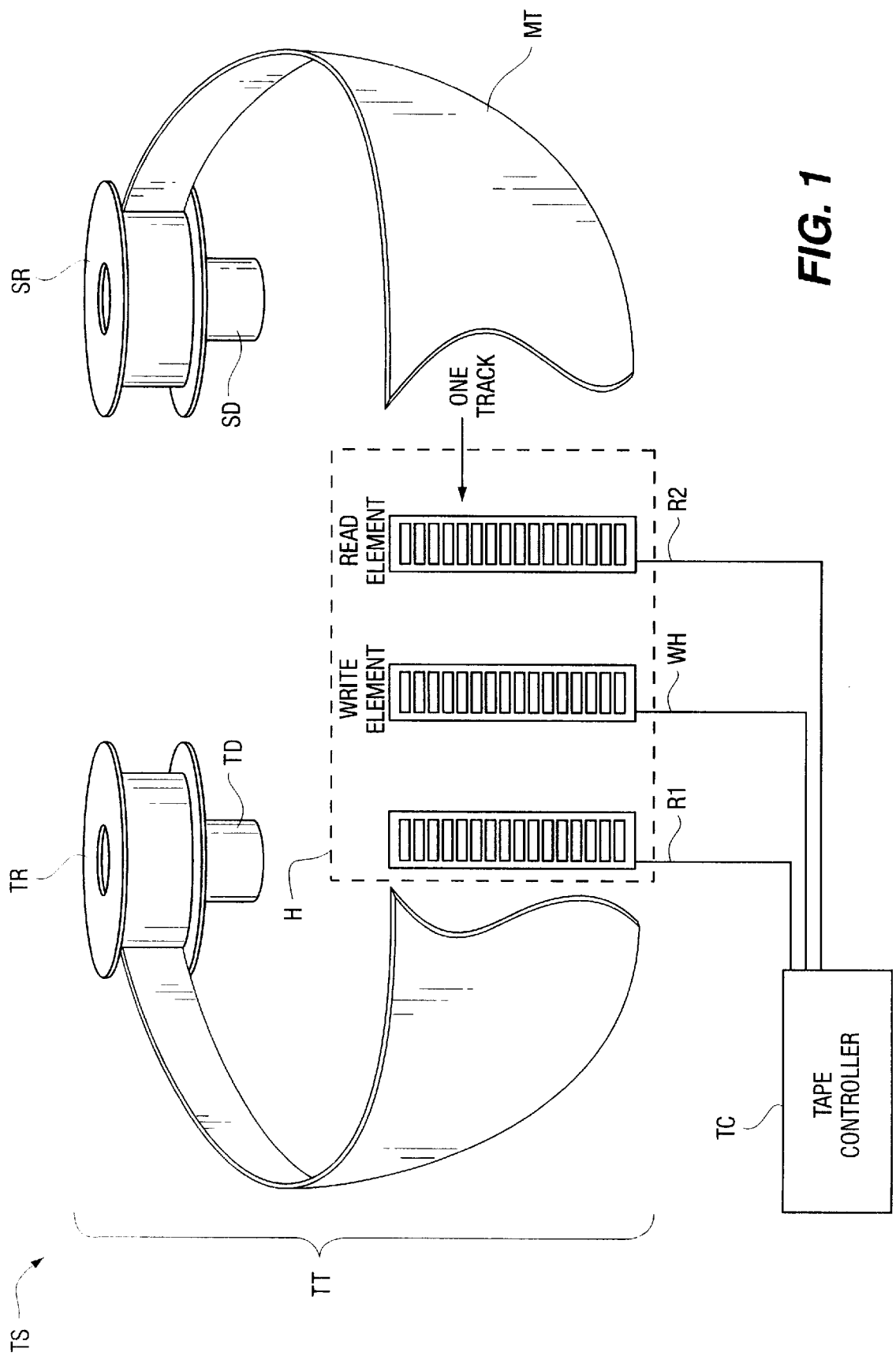
FIG. 1 illustrates in block diagram form the architecture of a typical tape drive that includes the present system for gap positioning optimization in a tape drive.

FIG. 1 illustrates in block diagram form the architecture of a typical tape drive TS that includes the present system for gap positioning optimization in a tape drive. The tape drive TS comprises a tape controller TC that contains the program instructions to regulate the operation of the tape drive TS, and format the data read to and written from the tape MT, as well as a tape transport mechanism TT that comprises the hardware that is used to effect the movement of the tape. The tape transport mechanism TT includes a source reel SR and a takeup reel TR with their associated drive motors and servo circuits SD, TD, respectively. The tape MT is guided in well known fashion along a tape path across a set of read and write heads H that are positioned between the source SR and takeup TR reels. The tape drive controller TC regulates the operation of the drive motors SD, TD and receives feedback from these drive motors SD, TD regarding the tape position. This is accomplished by the servo mechanisms in the drive motors SD, TD that function to count the number of revolutions of the tape reel and translate this data into tape position data. In this manner, the tape drive controller TC can identify, with some degree of accuracy, the location of a data block that is written on the tape MT. Given that the tape MT is of significant length and numerous data blocks are written on the tape MT, the servo mechanisms must be precisely operating elements to avoid the problem that the tape drive TS becomes out of synchronization with the location of data blocks on the tape MT. A further complicating factor is that the tape MT is subject to stretching and does not maintain a constant length. A significant amount of design effort and manufacturing expense are therefore allocated to the servo mechanisms to ensure that the data blocks can be accurately located.

In the present tape drive TS, the tape heads H comprise three heads: two read heads R1, R2 and a single write head WH. The present tape drive TS is equipped to read and write data on to the tape MT in a bidirectional manner. In the normal course of writing data on to the tape MT, a tape drive TS reads back the data as it is written to the tape MT to ensure the integrity of the data written on the tape MT. A read head is therefore placed a predetermined distance from the write head downstream as defined by the direction of tape movement. Therefore, in a tape drive TS that reads and writes data in both directions on a tape MT, a read head R1, R2 must be located on both sides of the write head WH to enable the read back check of the data as it is written, regardless of the direction of tape movement. As shown in FIG. 1, the two read heads R1, R2 are placed one on either side of the write head WH, a predetermined distance from the write head WH. The tape MT moves from right to left in this diagram to read/write in the forward direction. Therefore, the read head R1 on the left side of the write head WH functions as the read back check read head for write operations in the forward direction. Similarly, the tape moves from left to right in this diagram to read/write in the backward direction. Therefore, the read head R2 on the right side of the write head WH functions as the read back check read head for write operations in the backward direction.

As described below, the read heads are also used to verify the location of the inter-block gaps that are formed on the tape MT. The read head that is located upstream of the write head is used for this purpose. Therefore, the read head R2 on the right side of the write head WH functions as the inter-block gap check read head for write operations in the forward direction. Similarly, the read head R1 on the left side of the write head WH functions as the inter-block gap check read head for write operations in the backward direction.

Standard Automatic Tape Repositioning Operation

Figure 2:
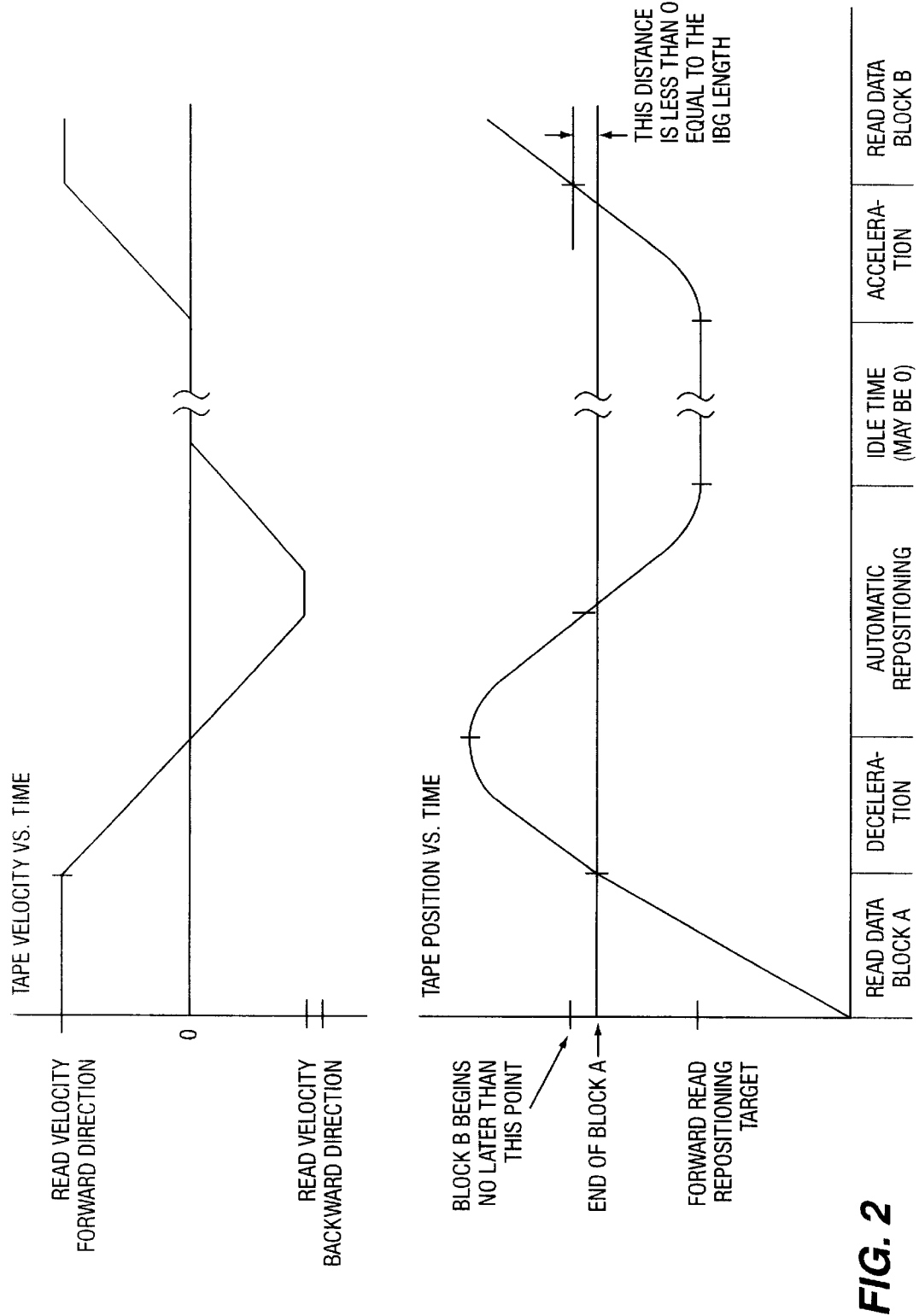
FIG. 2 illustrates a timing diagram that shows tape velocity and position in a normal data read operation that is followed by a data read operation in the same direction.
Figure 4:
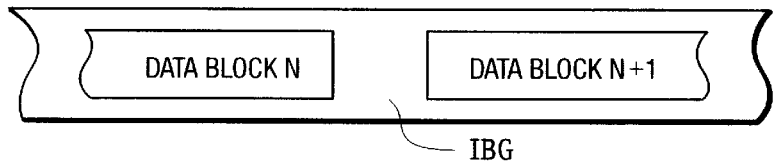
FIG. 4 illustrates the typical pattern of data blocks that are written on a tape by the tape drive.

FIG. 2 illustrates a timing diagram that shows the tape velocity and tape position as a function of time in a standard tape repositioning operation wherein a read operation in a forward direction is followed by a subsequent timewise delayed read operation in a forward direction. This sequence of operations is selected due to its simplicity and functions to illustrate the basic functioning of a tape repositioning operation. In FIG. 2, the top diagram illustrates tape velocity as a function of time, while the lower diagram illustrates the position of the tape MT as a function of time. Along the horizontal axis of the lower diagram is a listing of the various operations that take place in the tape transport mechanism TT. FIG. 4 illustrates the typical format of the data blocks that are written on the tape, with each successive data block being separated from the previously written data block by an inter-block gap.

The first diagram in FIG. 2 contains two notations along the vertical axis, and these are: read velocity—forward direction and read velocity—backward direction. These two notations indicate that the tape drive TS can operate in both directions, with the graph above the axis representing forward motion and the graph below the axis representing tape motion in the reverse direction. With respect to the first operational segment noted along the bottom of FIG. 2, termed "Read Data Block A," the velocity of the tape MT as indicated in the top diagram is a constant fixed read velocity in the forward direction (above the axis in the top diagram). When the tape drive TS reaches the end of Block A as indicated in the bottom diagram of tape position, and there is presently no subsequent data block to be read, the tape controller TC enters the deceleration mode as noted along the bottom of FIG. 2 and stops the tape forward motion by transmitting control signals to the tape transport TT to decelerate the tape MT. As indicated by the top diagram, the tape velocity linearly decreases from the read velocity in the forward direction down to the zero point of the axis where the tape MT is stopped at a point indicated in the bottom diagram a significant distance past the end of data block A and also a significant distance past the beginning of Data Block B.

In order to reposition the tape MT so that the data block adjacent to Data Block A can be read at the beginning of the data block boundary, the tape MT must be repositioned so that the tape transport TT can bring the tape MT to the appropriate read velocity prior to the beginning of Data Block B. This requires that the tape MT be backed up a predetermined distance from its present position. The tape controller TC now enters the Automatic Tape Repositioning mode as indicated along the bottom of FIG. 2 and continues the deceleration of the tape MT past the zero point in a negative direction, which comprises accelerating the tape MT in the reverse direction to back the tape MT up the required distance. The acceleration of the tape MT in the reverse direction continues for a short period of time and is then terminated when a predetermined distance has been reached. The tape MT is then decelerated to a stop at the end of the Automatic Tape Repositioning mode where the tape velocity is zero and the tape position is at the Forward Read Position Target, which comprises the predetermined distance from the beginning of data block B required for the tape transport TT to get the tape MT up to read forward direction speed.

The tape controller TC then enters the Idle Time mode which represents the time between the completion of the Automatic Tape Repositioning mode and the receipt of a subsequent read forward operation request. The receipt of such a request results in the tape controller TC activating the tape transport TT to enter the Acceleration mode and accelerate the tape MT in the forward direction. This acceleration is represented in the top diagram as an upwardly sloping straight line which levels off at the read velocity forward direction point indicated in the vertical axis of the top diagram. The bottom diagram indicates the corresponding tape position, with the tape MT reaching the read velocity forward direction point at or before the beginning of Data Block B, noted on the diagram as "less than or equal to the IBG length." At this point, the tape controller TC enters the Read Data Block B mode where the tape velocity is constant and the tape position linearly changes over time as data is read from the tape MT.

The above-noted automatic tape repositioning operation is illustrative of the repositioning function. The following description represents a slight variation of this operation, where the subsequently received operation is a data write operation.

Servo Control of Tape Position

The positioning of the tape MT with respect to the read R1, R2 and write WH heads is accomplished by servo mechanisms that are attached to the tape transport TT. The servo mechanisms track the physical position of the tape MT as it is transported over the read R1, R2 and write WH heads form the source reel SR to the takeup reel TR. However, the servo mechanisms are mechanically based and introduce a certain amount of error in the calculation of the tape position. Given the number of tape position determinations, as well as velocity determinations, that are required to automatically reposition the tape MT for a subsequent read operation in the forward direction, the errors introduced into the tape position determination can accumulate over numerous iterations of this automatic repositioning operation and represent a significant portion of the interblock gap. Therefore, the length of the inter-block gap is selected to account for this error accumulation, since there is no positive feedback regarding the true location of the data block - inter-block gap boundaries.

System For Gap Positioning Optimization In A Tape Drive

The present system for gap positioning optimization in a tape drive GP overcomes the limitations of existing tape drives TS by providing direct feedback regarding the location of the data block to inter-block gap boundaries. This is accomplished by making use of the above-noted read heads R1, R2, which are positioned on either side of the write head WH, to identify the boundary between the present data block and the inter-block gap formed at the end of the present data block. The present system for gap positioning optimization in a tape drive GP is implemented as part of the tape controller TC and makes use of the existing tape transport TT mechanisms.

Figure 3:
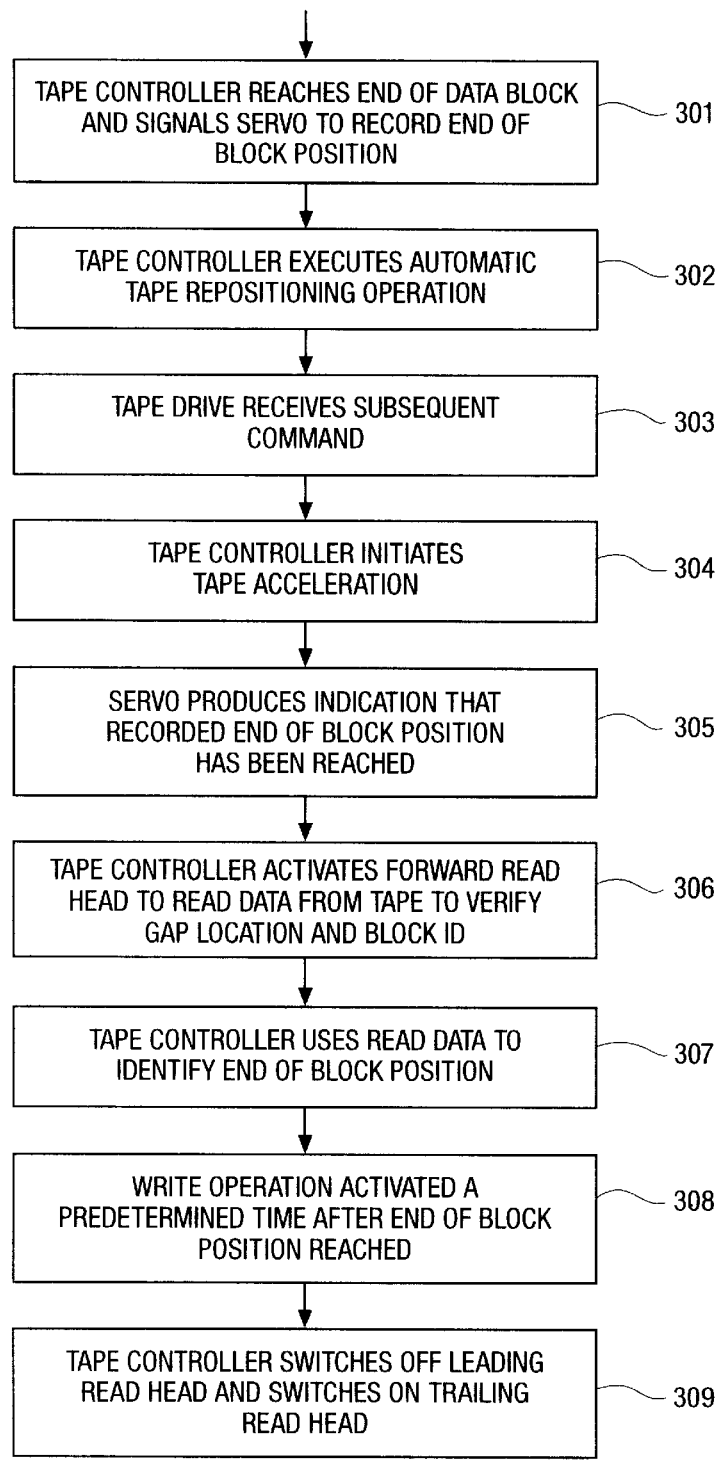
FIG. 3 illustrates in flow diagram form the operation of the present system for gap positioning optimization in a tape drive.

As noted above, the tape drive TS includes two read heads: R1, R2 with one located on either side of the write head WH. FIG. 3 illustrates in flow diagram form the operation of the present system for gap positioning optimization in a tape drive GP which makes use of the three heads and the existing servo mechanisms to accurately locate the boundary between the present data block written on the tape MT and the inter-block gap that is formed at the end of the present data block. The gap positioning can be verified before the writing of data begins on the tape MT to avoid corrupting data blocks written on the tape MT. The tape drive TS uses the forward read head to read the prior data on the tape, searching for the gap where the writing is to begin.

In operation, the tape controller TC reaches the end of reading (or writing) the present data block as is well known in tape drives and then signals the servo mechanism at step 301 to record the end of block position which is the boundary between the present data block (Data Block N) and the inter-block gap (IBG). The tape controller TC then executes an automatic tape repositioning operation at step 302, as is well known in tape drives. The tape drive TS subsequently receives another read/write command at step 303 and initiates a tape acceleration operation at step 304 to bring the tape MT up to the proper speed to read/write data on the tape MT in the data block N+1 location on the tape MT. When the servo mechanism generates an "at last remembered gap position" signal at step 305, the tape controller TC looks for the Data Block N to inter-block gap transition with the forward read head R2 at step 306. This is accomplished by the upstream read head R2 reading the data in Data Block N from the tape MT and verifying the correct block ID of block N until the absence of data comprising the inter-block gap IBG is encountered by the upstream read head R2. (Alternatively, the upstream read head R2 can be switched on at the some point earlier in the tape acceleration process.) The tape controller TC recognizes the absence of data to represent the inter-block gap IBG. Once the inter-block gap is located by the tape controller TC at step 307, the write operation is delayed one read head to write head distance in time and the write operation begins at a predetermined point in the nominal gap length at step 308. The tape controller TC can then switch the forward read head R2 off and switches on the trailing read head R1 at step 309 to verify the integrity of the data that is written on the tape MT by the write head WH.

The tape controller TC no longer relies exclusively on critical servo tachometer positioning in order to know when to begin writing data on the tape MT. Servo positioning tolerances can therefore be reduced, with less expensive servo systems being used in the tape drive TS at a significant cost savings. The write reliability is similarly enhanced by guaranteeing that the tape drive TS never overwrites existing data or by introducing a permanent undetected block ID sequence error by writing further down the tape MT. Finally, error recovery actions are greatly enhanced, in that the specific block N can be positively verified in this same way.

What is claimed:

1. A tape drive for reading/writing data records on a magnetic tape in either of two directions of tape movement, where a gap comprising a region having an absence of data is formed at the end of each data record written on said magnetic tape, said tape drive comprising:

read/write head means, comprising:

write head means for writing data on said magnetic tape as said magnetic tape is passed over said read/write head means in either of said two directions;

first and second read head means, positioned on opposite sides of said write head means, each selectively activatible for reading data written on said magnetic tape as said magnetic tape is passed over said read/write head in either of said two directions;

tape transport means for transporting said magnetic tape in a selected one of said two directions of tape movement across said read/write head means;

means for determining a position of said gap that is formed at an end of a selected data record written on said magnetic tape;

means responsive to said determining means for confirming the position of said gap; and magnetic tape positioning control means for enabling activation of said write head means to write data on said magnetic tape in response to said determining means and said confirming means, wherein a result of said determining means and said confirming means is a detected gap.

2. The tape drive of claim 1 wherein said magnetic tape positioning control means further comprises:

means, responsive to said detected gap, for activating said write head means for writing data on to said magnetic tape.

3. The tape drive of claim 1 wherein said determining means comprises:

means for identifying a location on said magnetic tape representative of a juncture between said selected data record and said gap.

4. The tape drive of claim 3 wherein said confirming means comprises:

means for activating a one of said first and second read head means that is located upstream from said write head means for said selected direction of tape movement to read data from said magnetic tape;

means, for receiving output representative of data read from said magnetic tape from said activated one of said first and second read head means; and means, responsive to said received output, for identifying an absence of data on said magnetic tape for a predetermined amount of time.

5. The tape drive of claim 4 wherein said magnetic tape positioning control means further comprises:

means, responsive to said detected gap, for activating said write head means for writing data on to said magnetic tape.

6. The tape drive of claim 5 wherein said magnetic tape positioning control means further comprises:

means, responsive to said detected gap, for disabling said activated one of said first and second read head means.

7. The tape drive of claim 5 wherein said magnetic tape positioning control means further comprises:

means, responsive to said detected gap, for enabling the other one of said two read head means from said activated one of said first and second read head means, to read data from said magnetic tape as it is written by said write head means.

8. The tape drive of claim 4 wherein said magnetic tape positioning control means further comprises:

means, responsive to said detected gap, for activating said write head means for writing data on to said magnetic tape after a delay of said predetermined time period.

9. A method of controlling the position of a magnetic tape in a tape drive that reads/writes data records on a magnetic tape in either of two directions of tape movement, where a gap comprising a region having an absence of data is formed at the end of each data record written on said magnetic tape, said tape drive comprising a read/write head that includes a write head for writing data on said magnetic tape as said magnetic tape is passed over said read/write head in either of said two directions and first and second read heads, positioned on opposite sides of said write head, each selectively activatible for reading data written on said magnetic tape as said magnetic tape is passed over said read/write head in either of said two directions; a tape transport for transporting said magnetic tape in a selected one of said two directions of tape movement across said read/write head, said method comprising the steps of:

determining a position of said gap that is formed at an end of a selected data record written on said magnetic tape;

responsive to determining said position of said gap, confirming said position of said gap, wherein a result of said determining step and said confirming step is a detected gap;

responsive to determining said position of said gap and confirming said position of said gap, enabling activation of said write head to write data on said magnetic tape.

10. The method of claim 9 wherein said step of enabling further comprises:

activating, in response to said detected gap, said write head for writing data on to said magnetic tape.

11. The method of claim 9 wherein said step of gap position determining step comprises:

identifying a location on said magnetic tape representative of a juncture between said selected data record and said gap.

12. The method of claim 11 wherein said step of confirming the position of said gap comprises:

activating a one of said first and second read heads that is located upstream from said write head for said selected direction of tape movement to read data from said magnetic tape;

receiving output representative of data read from said magnetic tape from said activated one of said first and second read heads; and identifying, in response to said received output, an absence of data on said magnetic tape for a predetermined amount of time.

13. The method of claim 12 wherein said step of enabling further comprises:

activating, in response to said detected gap, said write head for writing data on to said magnetic tape.

14. The method of claim 13 wherein said step of enabling further comprises:

disabling, responsive to said detected gap, said activated one of said first and second read head means.

15. The method of claim 13 wherein said step of enabling further comprises:

enabling, in response to said detected gap, the other one of said two read heads from said activated one of said first and second read heads, to read data from said magnetic tape as it is written by said write head.

16. The method of claim 12 wherein said step of enabling further comprises:

activating, in response to said detected gap, said write head for writing data on to said magnetic tape after a delay of said predetermined time period.

* * * * *